United States Patent [19]

Hattori et al.

[11] 4,232,061
[45] Nov. 4, 1980

[54] MAGNETIC RECORDING MEDIUM AND PROCESS FOR PRODUCING THE SAME

[75] Inventors: Seizi Hattori, Ibaragi; Koichi Makino, Yokohama; Takehiko Nakagawa, Kawasaki; Masayoshi Shinohara, Kokubunji, all of Japan

[73] Assignee: Fujitsu Limited, Japan

[21] Appl. No.: 825,790

[22] Filed: Aug. 18, 1977

[30] Foreign Application Priority Data

Sep. 1, 1976 [JP] Japan .................. 51-103736

[51] Int. Cl.² .................................. G11B 5/84
[52] U.S. Cl. ............................... 427/130; 204/192 M;
252/62.55; 252/62.56; 252/62.57; 252/62.58;
252/62.59; 252/62.6; 427/132; 428/900
[58] Field of Search ............... 156/605, 606; 428/900,
428/534, 336, 220; 204/192 R, 192 C, 192 M;
252/62.56, 61.57, 62.58, 62.59, 62.6, 62.55;
365/32; 340/134, 135; 427/127, 128, 130, 132;
423/632, 633, 634

[56] References Cited

U.S. PATENT DOCUMENTS

| 3,075,919 | 11/1963 | Gruber et al. ............... 423/634 |
| 3,414,372 | 12/1968 | Paulus et al. ............... 156/605 |
| 3,553,135 | 1/1971 | Bala et al. ............... 252/62.59 |
| 3,795,542 | 3/1974 | Hulaby et al. ............... 423/634 |
| 3,837,104 | 4/1974 | Van der Luar ............... 252/62.59 |
| 3,903,004 | 9/1975 | Matsumato et al. ............... 252/62.59 |
| 3,912,646 | 10/1975 | Leitner et al. ............... 423/634 |
| 3,995,093 | 11/1976 | Heinz ............... 428/900 |
| 3,996,095 | 12/1976 | Ahn et al. ............... 204/192 M |
| 4,003,813 | 1/1977 | Hattori et al. ............... 204/192 M |
| 4,013,534 | 3/1977 | Ishii ............... 360/135 |
| 4,032,674 | 6/1977 | Hirabagaski et al. ............... 252/62.55 |
| 4,086,174 | 4/1978 | Bennet et al. ............... 428/539 |
| 4,156,037 | 5/1979 | Hattori et al. ............... 427/136 |

FOREIGN PATENT DOCUMENTS 1210579 10/1970 United Kingdom ............... 423/633

*Primary Examiner*—Stanley S. Silverman
*Attorney, Agent, or Firm*—Staas & Halsey

[57] ABSTRACT

A thin film of ferrite for use as a magnetic recording medium includes (a) Cu and Ti or (b) Cu, Ti and Co. The inclusion of Ti extends upwards the upper limit of the range of temperature for reducing $\alpha$-$Fe_2O_3$ to $Fe_3O_4$, whereas the inclusion of Cu extends downwards the lower limit of this range. Further, the inclusion of both Ti and Cu enables the stable production of $\gamma$-$Fe_2O_3$ over a wide range of temperature for oxidizing $Fe_3O_4$ to said $\gamma$-$Fe_2O_3$. The inclusion of Co improves the magnetic properties of the ferrite.

12 Claims, 5 Drawing Figures

MAGNETIC RECORDING MEDIUM AND PROCESS FOR PRODUCING THE SAME

BACKGROUND OF THE INVENTION

1. Field of the Invention

The present invention relates to a process for producing a magnetic recording medium, particularly to a process for producing a magnetic recording medium using a thin film of an improved ferrite as the recording medium.

The term ferrite as used herein denotes iron oxide of $Fe_3O_4$ or $\gamma$-$Fe_2O_3$. The iron oxide is crystallized directly on a substrate for supporting the recording medium, such as an anodized aluminum disc, so that the ferrite crystals are formed in a continuous film on the substrate. That is, the crystals are not separated from each other by any binder.

2. Description of the Prior Art

It is generally known that as a recording medium, in addition to a thin film of ferrite, a coating film including acicular, crystalline particles of $\gamma$-$Fe_2O_3$ dispersed in a binder or an electrolytically deposited film of a Ni-Co alloy can be used.

The necessary conditions required for a highly dense recording medium are as follows:

(a) The coercive force must be high:

(b) The squareness ratio of the curve B/H must be high.

(c) The film must be thin, so that the distance between a magnetic head and the recording medium is small.

(d) In the case of ferrite, both the reduction of $\alpha$-$Fe_2O_3$ to $Fe_3O_4$ and the oxidation of the thus produced $Fe_3O_4$ to $\gamma$-$Fe_2O_3$ must be able to occur over a wide range of temperatures, so as to facilitate industrial production of both $Fe_3O_4$ and $\gamma$-$Fe_2O_3$.

Referring to the above item (c), a coating film incorporating $\gamma$-$Fe_2O_3$ is polished in order to be made thinner. However, it is difficult to make the thickness of such a film thinner than 1 micron, because the crystalline particles of $\gamma$-$Fe_2O_3$ are dispersed in a binder. On the other hand, a magnetic recording medium of a Ni-Co alloy can be easily provided in the form of a thin film. However, this alloy is corrosive and exhibits poor wear resistance and, therefore, it is necessary to apply a protective film with a thickness of about 0.2 micron on the film of a Ni-Co alloy. Thus, both the coating film incorporating $\gamma$-$Fe_2O_3$ and the electrochemically deposited film of a Ni-Co alloy do not satisfy the required high recording density of a recording medium.

It is well-known that a continuous film of ferrite can be formed with a thickness sufficiently thin as to produce a highly dense recording medium, and that such a film is far superior in corrosion and wear resistances to either the coating film incorporating $\gamma$-$Fe_2O_3$ or the film of the Ni-Co alloy. The film of ferrite is generally produced by the following steps.

A continuous film of $\alpha$-$Fe_2O_3$ is formed on a substrate by using any of the procedures of the reactive sputtering process, i.e., chemical sputtering process, the vacuum vapor deposition process, the reactive vapor deposition process, the vapor phase growth process, the chemical deposition process and the like. The $\alpha$-$Fe_2O_3$ is then heated in a reducing atmosphere to produce $Fe_3O_4$, which, if desired, is oxidized by heating in air to produce $\gamma$-$Fe_2O_3$. Thus, thin magnetic films of ferrite with a thickness of about 0.15 micron can be produced.

However, a process for producing a thin magnetic film of ferrite has the following difficulties.

One of the problems of the known films of ferrite used as a recording medium concerns the above item (d). That is, it is difficult to stably reduce $\alpha$-$Fe_2O_3$ to $Fe_3O_4$ and also to stably oxidize $Fe_3O_4$ to $\gamma$-$Fe_2O_3$, due to their narrow ranges of heating temperatures for reduction and oxidation, respectively.

Other problems of the films of ferrite concern the above-mentioned items (a) and (b). That is, their magnetic properties are less than desirable for use as a highly dense recording medium, in which the coercive force $H_c$ and the squareness ratio are desired to be more than 500 Oe and 0.7, respectively.

Hereinafter, the above-mentioned problems will be described in detail.

The disc of anodized aluminum adapted for use in a highly dense magnetic recording medium generally has a relatively large diameter of 14 inches. Therefore, it is desirable that the magnetic properties of a thin film of ferrite reduced and oxidized on the disc not be affected by the differences in temperature which are apt to appear both between the portions of one disc and between discs during their heat treatment.

$\alpha$-$Fe_2O_3$ must be reduced at a temperature above the lower limit of the range of reducing temperature so as to be reduced completely to $Fe_3O_4$, and also at a temperature below the higher limit of the range of reducing temperature in a controlled reducing atmosphere so that $\alpha$-$Fe_2O_3$ is not over-reduced to metallic iron.

The conventional $Fe_3O_4$ containing no additional metals exhibits poor magnetic properties, such as 300 Oe of coercive force and 0.4 of squareness ratio when obtained at a temperature in the narrow optimum range of from 300° to 325° C. Further, such conventional $Fe_3O_4$ is oxidized to a $\gamma$-$Fe_2O_3$ having 400 Oe of coercive force and 0.6 of squareness ratio only at a temperature very close to 230° C.

A process of producing ferrite containing Cu is disclosed in U.S. patent application Ser. No. 773,963 filed on Mar. 3, 1977 by S. Hattori et al. In the case of ferrite containing Cu, the optimum reducing temperature can be shifted lower and broadened to a range of from 225° to 300° C. However, the coercive force of $\gamma$-$Fe_2O_3$ containing Cu still remains low at any oxidizing temperature.

SUMMARY OF THE INVENTION

It is, therefore, an object of the present invention to provide a process for producing a magnetic recording medium of ferrite which can be produced over a wide range of temperature.

It is a further object of the present invention to provide a magnetic recording medium of ferrite which exhibits improved magnetic properties, such as coercive force and squareness ratio.

In accordance with the invention, there is provided a process for producing a magnetic recording medium of a thin film of ferrite, the process comprising the steps of:

forming a thin film of $\alpha$-$Fe_2O_3$ containing Cu in an amount of from 1 to 15% and Ti in an amount of from 1 to 10%, based on the number of atoms of Fe; and, reducing said $\alpha$-$Fe_2O_3$ to $Fe_3O_4$.

by heating said $\alpha$-$Fe_2O_3$ at a temperature in the range of from 225° to 400° C. in a reducing atmosphere. The reduction atmosphere is, preferably, hydrogen which is saturated with water vapor due to the bubbling of hydrogen through water in order to prevent over reduction of the α-Fe₂O₃ to metallic iron.

When the reducing temperature is lower than 225° C., the α-Fe₂O₃ remains unreduced, and when said temperature exceeds 400° C., the produced Fe₃O₄ is apt to be over-reduced to metallic iron. The preferable range of the reducing temperature is from 250° to 350° C.

Another process according to the invention includes a step of oxidizing Fe₃O₄ containing said Cu and said Ti to γ-Fe₂O₃. This oxidation is performed at a temperature in the range of from 150° to 450° C. The oxidation atmosphere, such as air, contains oxygen.

When the oxidizing temperature is lower than 150° C., Fe₃O₄ remains unoxidized, and when said temperature exceeds 450° C., the produced γ-Fe₂O₃ is converted to α-Fe₂O₃. Fe₃O₄ is, preferably, oxidized at a temperature in the range of from 200° to 450° C.

When the contents of Cu and Ti are lower than 1%, the effect of the addition thereof disappears. However, when either the content of Cu exceeds 15% or the content of Ti exceeds 10%, excessive reduction of the iron oxide may occur.

In accordance with the invention, there is provided a process for producing a magnetic recording medium of a thin film of ferrite, the process comprising the steps of:
  forming a thin film of α-Fe₂O₃ containing Cu in an amount of from 1 to 15%, and both Ti and Co in an amount of from 1 to 10% based on the number of atoms of Fe; and,
  reducing said α-Fe₂O₃ to Fe₃O₄.
by heating said α-Fe₂O₃ at a temperature in the range of from 225° and 400° C. in a reducing atmosphere. The reduction atmosphere is, preferably, hydrogen which is saturated with water vapor, due to the bubbling of hydrogen through water, in order to prevent over-reduction of α-Fe₂O₃ to metallic iron.

When the reducing temperature is lower than 225° C., the α-Fe₂O₃ remains unreduced, and when said temperaure exceeds 400° C., the produced Fe₃O₄ is apt to be over-reduced to metallic iron. The preferable range of the reducing temperature is from 250° to 350° C.

Another process according to the invention includes a step of oxidizing Fe₃O₄ containing said Cu, said Ti and said Co to α-Fe₂O₃. This oxidation is performed at a temperature in the range of from 150° to 450° C. The oxidation atmosphere, such as air, contains oxygen.

When the oxidizing temperature is lower than 150° C., Fe₃O₄ remains unoxidized, and when said temperature exceeds 450° C., the produced γ-Fe₂O₃ is converted to α-Fe₂O₃. Fe₃O₄ is, preferably, oxidized at a temperature in the range of from 200° to 450° C.

When the contents of Cu, Ti and Co are lower than 1%, the effect of the addition thereof disappears. However, when the content of Cu exceeds 15% and the content of Ti exceeds 10%, an excessive reduction may occur to the iron oxide. A Co amount of about 10% results in an extremely high coercive force which is higher than 2000 Oe, with the result being that a conventional magnetic head will not be able to read information written on a magnetic recording medium which exhibits such an unnecessarily high coercive force.

In accordance with the present invention, there is provided a magnetic recording medium of a thin film of ferrite, characterized in that the ferrite comprises a main component of Fe₃O₄, and additional components of Cu of from 1 to 15% and Ti of from 1 to 10%, based on the number of atoms of Fe. Due to the addition of said metals, the ferrite has a coercive force of above 400 Oe and a squareness ratio of about 0.5.

Also in accordance with the present invention, there is provided a magnetic recording medium consisting of a thin film of ferrite, characterized in that the ferrite comprises a main component of γ-Fe₂O₃, and additional components of Cu of from 1 to 15% and Ti of from 1 to 10%, based on the number of atoms of Fe. This ferrite has a relatively low coercive force of about 300 Oe and a squareness ratio of about 0.5.

In accordance with the present invention, there is provided a magnetic recording medium consisting of a thin film of ferrite, characterized in that the ferrite comprises a main component of Fe₃O₄, and additional components of Cu of from 1 to 15% and Ti and Co both of from 1 to 10%, based on the number of the atoms of Fe. Due to the addition of said metals, the ferrite has a coercive force of about 300 Oe and a squareness ratio of about 0.5.

Also in accordance with the present invention, there is provided a magnetic recording medium of a thin film of ferrite, comprising a main component of γ-Fe₂O₃, and additional components of Cu of from 1 to 15% and both Ti and Co of from 1 to 10%, based on the number of atoms of Fe. This ferrite has a high coercive force of above 1000 Oe and a high squareness ratio of about 0.7.

The added Cu, Ti and Co are believed to be present in the crystals of the iron oxides, either as metallic ions in a solid solution, or as crystals of oxides mixed with the iron oxides depending upon the contents of Cu, Ti and Co in the iron oxides.

The thin film of ferrite according to the present invention generally has a thickness of from 0.05 to 1 micron, preferably from 0.05 to 0.4 micron.

BRIEF DESCRIPTION OF THE DRAWINGS

The invention is further illustrated with reference to FIGS. 1 through 5, wherein.

DESCRIPTION OF THE PREFERRED EMBODIMENTS

The electrical resistances of Fe₃O₄ films were measured by a method referred to as the four probe method, where the electrical resistance of Fe₃O₄ was measured between two points separated by 0.25 mm from each other on the magnetic thin film. In addition to the measurement of resistance, measurement of saturation magnetization and X-ray diffraction were performed to investigate the degree of reduction in the thin film.

According to measurement of saturation magnetization and X-ray diffraction, it was found that α-Fe₂O₃ was reduced to Fe₃O₄ at a resistance value ranging from $10^2$ to $10^4\Omega$; whereas $\alpha$-$Fe_2O_3$ remained unreduced when the resistance value exceeded $10^4\Omega$, and $\alpha$-$Fe_2O_3$ was excessively reduced to Fe when the resistance value was decreased to $10^2\Omega$ or less.

Figure 1:
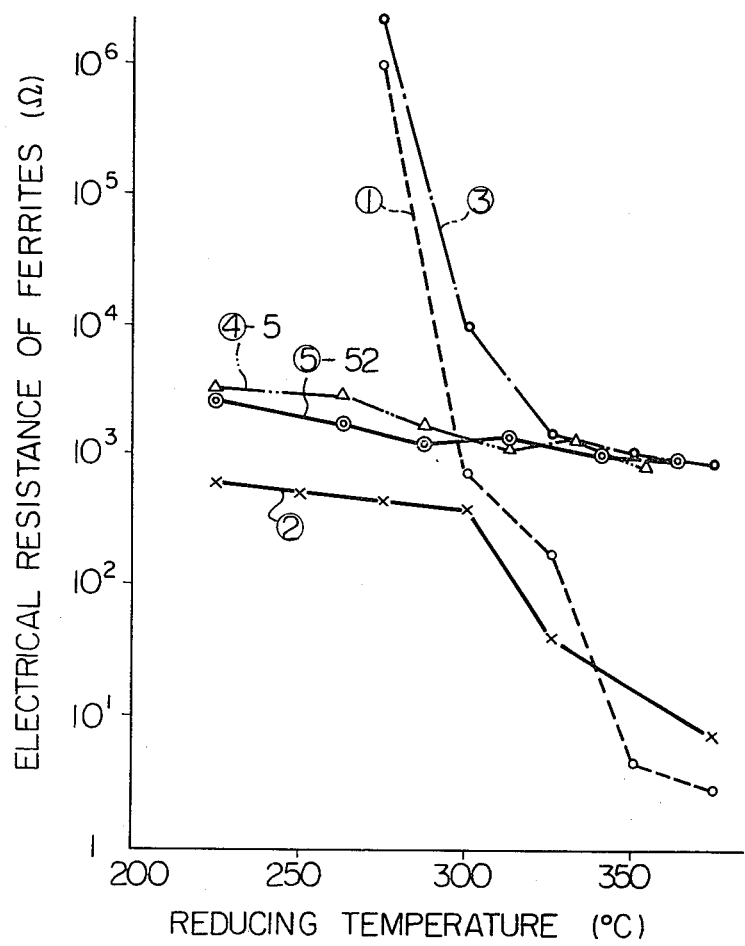
FIG. 1 is a graph representing the relationship between the electrical resistance of ferrites and the reducing temperature thereof.

The $\alpha$-$Fe_2O_3$ films containing additional metals were produced by a reactive sputtering process on the anodized aluminum substrate and reduced at a temperature in the range of from 225° to 375° C., in hydrogen bubbled through water at 10° C. The relationship between the electrical resistance of the thus obtained $Fe_3O_4$ and the reduction temperature is illustrated in FIG. 1. In FIG. 1, reference numerals ①, ②, ③, ④-5 and ⑤-52 indicate ferrite film containing no additional metals, 5% of Cu, 5% of Ti, 5% of both Cu and Ti, 5% of both Cu and Ti and 2% of Co, based on the number of Fe, respectively.

The following facts will be clear from FIG. 1.

(1) $\alpha$-$Fe_2O_3$ film ① containing no additional metals can be reduced to $Fe_3O_4$ within a temperature range of from 300° to 325° C.

$\alpha$-$Fe_2O_3$ film ② containing 5% of Cu can be reduced to $Fe_3O_4$ within a lower temperature range of from 225° to 300° C.

$\alpha$-$Fe_2O_3$ film ③ containing 5% of Ti can be reduced to $Fe_3O_4$ within a higher temperature range of from 325° to 375° C.

(4) $\alpha$-$Fe_2O_3$ film ④-5 containing 5% of both Cu and Ti can be reduced to $Fe_3O_4$ within a wide temperature range of from 225° to 350° C.

(5) $\alpha$-$Fe_2O_3$ film ⑤-52 containing 5% of both Cu and Ti and 2% of Co can also be reduced to $Fe_3O_4$ within the wide temperature range of from 225° to 350° C.

The above-mentioned advantageous effects of Cu and Ti were proved to be not dependent upon the Cu content up to 15% and the Ti content up to 10%, based on the number of atoms of Fe, respectively. The addition of Co into the iron oxides has almost no influence upon the reduction characteristics of $\alpha$-$Fe_2O_3$ to $Fe_3O_4$. Due to the feature of the reducing temperature range being increased, according to the present invention, it is possible to stably produce $Fe_3O_4$ films without any danger of excessively reducing the $\alpha$-$Fe_2O_3$ to metallic iron. In addition to this feature, it should also be noted that the resistance value of the $Fe_3O_4$ with Cu and Ti does not change greatly within the wide range of the reducing temperature of from 225° to 400° C., and the resistance value varies only from $10^3$ to $3\times10^3\Omega$.

The film of ferrite should contain Cu in an amount not exceeding 15%, because the saturation magnetization is decreased as a result of emergence of the properties of Cu-ferrite and, also, as a result of submergence of the properties of $Fe_3O_4$. The content of Cu in the ferrite should, preferably, be from 2.5 to 7.5%, from the points of view of both the reduction temperature and the magnetic properties.

The $Fe_3O_4$ films containing Cu and Ti each of 5%, produced by the above-mentioned process, were further subjected to an oxidation of $Fe_3O_4$ to $\gamma$-$Fe_2O_3$ under a known condition, i.e., heating the $Fe_3O_4$ at a temperature of from 150° to 450° C. in the air. The thus treated films were subjected to a measurement of the coercive force and the squareness ratio thereof.

Figure 2:
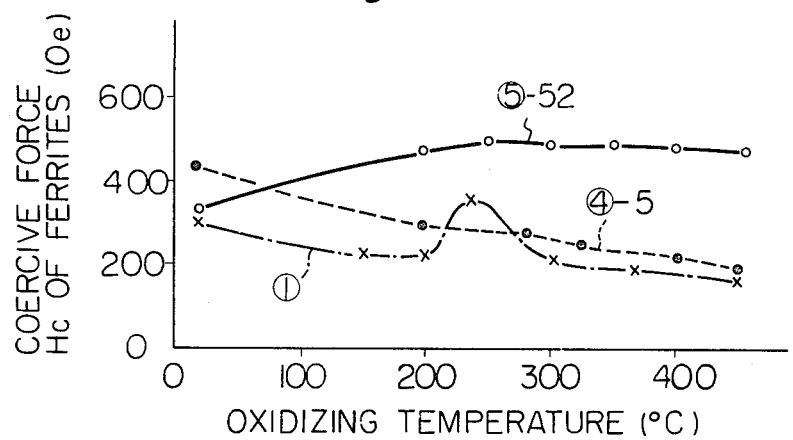
FIG. 2 is a graph representing the relationship between the coercive force of some of said ferrites of FIG. 1 and the oxidizing temperature thereof.
Figure 3:
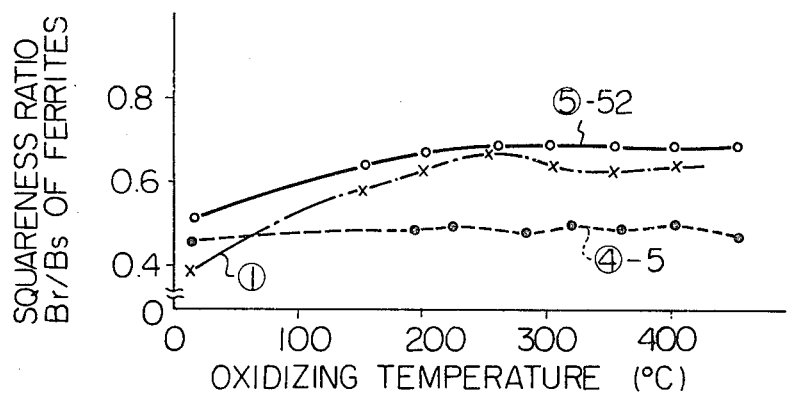
FIG. 3 is a graph representing the relationship between the squareness ratio of some of said ferrites of FIG. 1 and the oxidizing temperature thereof.

The relationship between the coercive force and the oxidizing temperature, and the relationship between the squareness ratio and the oxidizing temperature are illustrated in FIGS. 2 and 3, respectively, with regard to: ferrite ① without additional metals; ferrite ④-5 with Cu and Ti, both of 5%, and; ferrite ⑤-52 with Cu and Ti, both of 5%, and Co of 2%.

In FIGS. 2 and 3, the ferrites with data points indicated at 25° C. are $Fe_3O_4$, and ferrites oxidized at a temperature above 150° C. are considered to be $\gamma$-$Fe_2O_3$. The effect of the additional metals is not so distinct at 25° C. in the case of $Fe_3O_4$.

As shown in FIG. 2, $\gamma$-$Fe_2O_3$ ①, without additional metals, exhibits a peak coercive force below 400 Oe at the oxidizing temperature of about 250° C. $\gamma$-$Fe_2O_3$ ④-5, with Cu and Ti, each of 5%, exhibits a still low coercive force, although said peak disappears. $\gamma$-$Fe_2O_3$ ⑤-52, containing Cu and Ti, both of 5%, and Co of 2%, exhibits a stable high coercive force of 500 Oe.

As shown in FIG. 3, $\gamma$-$Fe_2O_3$ ④-5, with Cu and Ti, each of 5%, exhibits a low squareness ratio of below 0.5. However, $\gamma$-$Fe_2O_3$ ⑤-52, with Cu and Ti, each of 5%, and Co of 2%, exhibits a high squareness ratio of 0.7.

Figure 4:
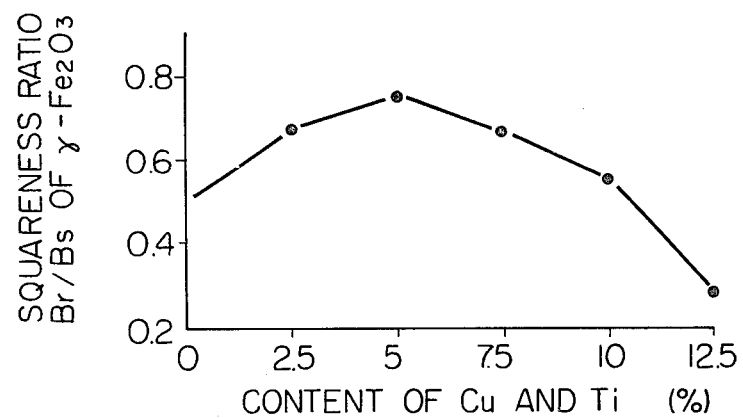
FIG. 4 is a graph representing the relationship between the squareness ratio of ferrites and the contents of both the Cu and Ti thereof.

FIG. 4 shows the squareness ratio of $\gamma$-$Fe_2O_3$ ④-5, with Cu and Ti each of the same % as indicated, sputtered, as an exception, on the surface of a glass substrate. (In the case of the experiments illustrated in the other Figures, the starting film of $\alpha$-$Fe_2O_3$ was sputtered on the anodized aluminum.) Therefore, the absolute values of the squareness ratio are higher than those of films sputtered on the surface of an anodized aluminum substrate, as shown in FIG. 3. However, it will be understood from FIG. 4 that the squareness ratio of $\gamma$-$Fe_2O_3$, with Cu and Ti each of 5%, exhibits a maximum value above 0.7.

Figure 5:
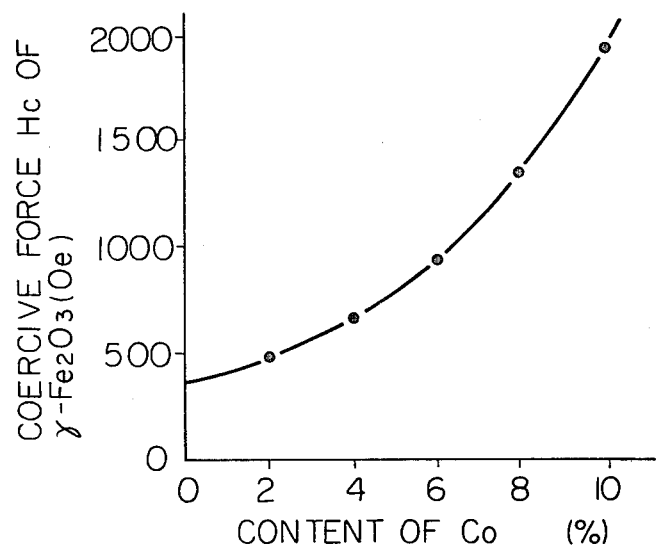
FIG. 5 is a graph representing the relationship between the coercive force and the content of Co, with regard to ferrites which contain Cu, Ti and Co.

FIG. 5 shows that the coercive force of $\gamma$-$Fe_2O_3$, with Cu and Ti each of 5%, increases with increasing content of Co. The thin film of $\gamma$-$Fe_2O_3$ exhibits a high coercive force of 2000 Oe, with Cu and Ti each of 5% and Co of 10%, based on the number of atoms of Fe. However, the Co content should not exceed 10%, because the coercive force becomes unnecessarily higher than the required coercive force of the magnetic recording medium, which is suitable for use in combination with the presently available magnetic heads.

Hereinafter, the present invention will be illustrated in more detail with reference to specific examples; however, these examples are not to be construed to limit the scope of the invention.

EXAMPLE 1

An Fe-target was prepared by melting iron and the additional metals shown below in a vacuum. The Fe-target was placed in a sputtering apparatus, in which the pressure of a mixed gas of 80% of Ar and 20% of $O_2$ was adjusted to $6\times10^{-3}$ Torr, and an RF power with a density of 2.8 W/cm² was applied thereto. Thus, thin films, composed mainly of $\alpha$-$Fe_2O_3$, were formed to a thickness of about 0.15 micron on an aluminum substrate, on each of which an anodic oxidation film, with a thickness of about 3 microns, was first formed.

The $\alpha$-$Fe_2O_3$ films contained the following additional metals, based on the number of atoms of Fe.

① none
② Cu of 5%
③ Ti of 5%
④ Cu and Ti, both of 5%
⑤ Cu and Ti, both of 5%, and Co of 2%

The $\alpha$-$Fe_2O_3$ films were heated over a period of one hour at several distinct temperature levels of between 225° and 425° C., in an atmosphere of humid hydrogen gas, which was bubbled through water of about 10° C. prior to being used as each atmosphere gas. The electrical resistance of the film was measured between two points thereof separated 0.25 mm from one another, so as to determine the reduction degree of each film.

Referring to FIG. 1, the thin films of reduced ferrites are composed mainly of $Fe_3O_4$ when the electrical resistance is in the range of from $10^2$ to $10^4\Omega$.

While $\alpha$-$Fe_2O_3$ without any additional metals is reduced at a limited optimum temperature range of from 300° to 325° C., $\alpha$-$Fe_2O_3$ with Cu can be reduced within a lower temperature range of from 225° to 300° C. $\alpha$-$Fe_2O_3$ with Cu and Ti can, according to the present invention, be reduced over a wide range of from 225° to 375° C., and; $\alpha$-$Fe_2O_3$ with Cu, Ti and Co can, according to the present invention, be reduced also over the same wide range of temperature of from 225° to 375° C.

In addition, the thin film of $Fe_3O_4$ reduced at a temperature over 400° C. exhibited lower magnetic properties.

EXAMPLE 2

The $\alpha$-$Fe_2O_3$ films ①, ④ and ⑤ of Example 1, were formed and reduced in the same way as in Example 1, except that the former one was reduced at 300° C. and the latter two were reduced at 275° C. The thus obtained magnetic thin films of $Fe_3O_4$ ①, ④ and ⑤ exhibited low coercive forces, indicated at 25° C. in FIG. 2, of from 300 to about 400 Oe.

Then, the films of $Fe_3O_4$ were oxidized to $\gamma$-$Fe_2O_3$ in the air over a period of one hour at intervals of every 50 degrees from 200° to 450° C. The thus obtained thin magnetic films composed mainly of $\gamma$-$Fe_2O_3$ ⑤, according to the invention, exhibited a high coercive force of about 500 Oe, as can be seen in FIG. 2.

Referring to FIG. 3, $Fe_3O_4$ films ①, ④ and ⑤ exhibited low squareness ratios of from 0.4 to about 0.5. However, $\gamma$-$Fe_2O_3$ films corresponding to the invention exhibited high squareness ratios of about 0.7.

In addition, the magnetic fluxes of ferrite ⑤ tended to decrease to a value lower than that of ferrite ① at an oxidizing temperature above 500° C., because the ferrite ⑤ was converted to $\alpha$-$Fe_2O_3$.

EXAMPLE 3

Thin magnetic films of ferrites were prepared in the same way as in Example 1, except that they contained Cu and Ti, both at intervals of every 2.5%, from 2.5 to 12.5%, each based on the number of atoms of Fe, formed on a glass substrate and reduced at 275° C., and oxidized to $\gamma$-$Fe_2O_3$ at 300° C. FIG. 4 shows the relationship of each of the Cu and Ti content, of the above-mentioned $\gamma$-$Fe_2O_3$ containing Cu, Ti and Co, to the squareness ratio thereof. The squareness ratio exhibited a maximum value of 0.75 at the Cu and Ti contents of 5% each. The squareness ratio decreased with the increasing Cu and Ti content, each above 5%, because oxides of Cu and Ti are produced which affect the magnetic properties of the ferrite.

EXAMPLE 4

Thin magnetic films of ferrites were prepared in the same way as in Example 1, except that they contained Cu and Ti, each of 5%, and Co at intervals of 2%, from 2 to 10%, based on the number of atoms of Fe, and reduced at 275° C. and oxidized to $\gamma$-$Fe_2O_3$ at 300° C.

The coercive force of the $\gamma$-$Fe_2O_3$ containing only Cu and Ti, both of 5%, is about 400 Oe, as can be seen in FIG. 5, and the coercive force of said $\gamma$-$Fe_2O_3$ increases to a value of about 900 Oe with Co of 6% added, and further, to about 2000 Oe with Co of 10% added.

EXAMPLE 5

An evaporation source was prepared by mixing pure metallic powders of Fe, Cu, Ti and Co in an atomic ratio of 100%, 5%, 5% and 2%, respectively. The evaporation source was placed in a vacuum evaporation apparatus, in which the pressure of oxygen was maintained at $3\times10^{-4}$ Torr. An $\alpha$-$Fe_2O_3$ film of 0.15 micron thickness was deposited on an anodized aluminum substrate by heating the evaporation source at a deposition rate of 20 Å/sec.

The $\alpha$-$Fe_2O_3$ film was heated in an atmosphere of humid hydrogen at 275° C. for one hour. The thus produced $Fe_3O_4$ film was heated in the air at 300° C. for one hour. The resulting $\gamma$-$Fe_2O_3$ film, which contained 5% Cu, 5% Ti and 2% Co, based on the number of atoms of Fe, exhibited a coercive force Hc of about 500 Oe and a squareness ratio Br/Bs of about 0.7. These values are substantially the same as those of the $\gamma$-$Fe_2O_3$ film obtained in the case of ⑤ in Example 2.

EXAMPLE 6

A coating solution was prepared by disolving $Fe(NO_3)_3$, $Cu(NO_3)_2$, $Ti(NO_3)_4$ and $Co(NO_3)_2$ in an aqueous isopropyl alcohol solution so that metallic ions, i.e. $Fe^{+++}$, $Cu^{++}$, $Ti^{++++}$ and $Co^{++}$ were contained in an ionic ratio of 100%, 5%, 5% and 2%, respectively. Then, the coating solution was spread over an anodized aluminum substrate by spin coating and heated in the air at 300° C. for one hour to produce an $\alpha$-$Fe_2O_3$ film of 0.15 micron thickness. The thus produced film was heated in a humid hydrogen atmosphere at 275° C. for one hour to produce a $Fe_3O_4$ film, which was heated in the air at 300° C. for one hour to produce a $\gamma$-$Fe_2O_3$ film. The resulting $\gamma$-$Fe_2O_3$ film, which contained 5% of Cu, 5% of Ti and 2% of Co, based on the number of atoms of Fe, exhibited a coercive force Hc of about 500 Oe and a squareness ratio Br/Bs of about 0.7. These values are substantially the same as those of the $\gamma$-$Fe_2O_3$ film obtained in the case of ⑤ in Example 2.

EXAMPLE 7

Three kinds of $\gamma$-$Fe_2O_3$ films, containing 5% of Cu, 5% of Ti and 2% of Co, each based on the number of Fe atoms, were produced on anodized aluminum discs 14 inches in diameter by reactive sputtering (as in Example 1), reactive vapor deposition (as in Example 5) and chemical deposition (as in Example 6), respectively.

The recording characteristics of these $\gamma$-$Fe_2O_3$ films were determined by means of a Ni-Zn ferrite head of 0.67 micron gap length and 530 microns core width, under the operational conditions of 7 m/sec peripheral speed of the disc and 0.25 micron flying height of the head. The recording density of the discs, resulting from any one of the above mentioned three kinds of $\gamma$-$Fe_2O_3$ film, exhibited about 700 bits/mm.

What we claim is:

1. A process for producing a magnetic recording medium of a thin film of ferrite, comprising the steps of:
    forming a thin film of $\alpha$-$Fe_2O_3$ containing Cu in an amount of from 1 to 15%, Ti in an amount of from 1 to 10% and Co in an amount of from 1 to 10%, based on the number of atoms of Fe of said ferrite;
    reducing said $\alpha$-$Fe_2O_3$ to $Fe_3O_4$ by heating said $\alpha$-$Fe_2O_3$ at a temperature in the range of from 225° to 400° C. in a reducing atmosphere; and, oxidizing said $Fe_3O_4$ to $\delta$-$Fe_2O_3$ by heating said $Fe_3O_4$ at a temperature in the range of from 150° to 450° C. in an oxidizing atmosphere.

2. A process for producing a magnetic recording medium of a thin film of ferrite, comprising the steps of:

forming a thin film of $\alpha$-$Fe_2O_3$ containing Cu in an amount of from 2.5 to 7.5%, Ti in an amount of from 2.5 to 7.5% and Co in an amount of from 2 to 8%, based on the number of atoms of Fe of said ferrite, reducing said $\alpha$-$Fe_2O_3$ to $Fe_3O_4$ by heating said $\alpha$-$Fe_2O_3$ at a temperature in the range of from 250° to 350° C. in a reducing atmosphere; and, oxidizing said $Fe_3O_4$ to $\gamma$-$Fe_2O_3$ by heating said $Fe_3O_4$ at a temperature in the range of from 200° to 450° C. in an oxidizing atmosphere.

3. A process according to claim 2, wherein said reducing atmosphere contains hydrogen, which is bubbled through water prior to the employment in said oxidizing atmosphere.

4. The method of claim 1 comprising oxidizing said film of $Fe_3O_4$ at a temperature in the range from 200° to 450° C.

5. The process of claim 1 or 2, said thin film of $\gamma$-$Fe_2O_3$ having thickness between 0.05 and 1 micron and a bit density of up to 700 bits/mm.

6. The method of claim 1 comprising reducing said $\alpha$-$Fe_2O_3$ at a temperature in the ranges between 225° and 300° C. and 325° and 400° C.

7. The method of claim 1 or 2 comprising forming said thin film of $\gamma$-$Fe_2O_3$ to comprise a coercive force of more than 500 Oe and a squareness ratio of more than 0.5.

8. A method of reducing a film of $\alpha$-$Fe_2O_3$ within a broadened temperature range comprising forming said film to comprise Cu from 1 to 15% and Ti from 1 to 10%, based on the number of Fe atoms of said film, and reducing said film to $Fe_3O_4$ in a reducing atmosphere at a temperature between 225° and 400° C.

9. The method of claim 8 comprising reducing said film of $\alpha$-$Fe_2O_3$ at a temperature in the ranges from 225° to 300° C. and from 325° to 400° C.

10. The method of claim 8 or 9 comprising reducing said film to $Fe_3O_4$ with a coercive force of at least 400 Oe and a squareness ratio of up to about 0.5.

11. A method of oxidizing a thin film of $Fe_3O_4$ to $\gamma$-$Fe_2O_3$ at a temperature within a broadened temperature range to have a coercive force over 500 Oe and a squareness ratio over 0.5 comprising forming said thin film of $Fe_3O_4$ to comprise 1 to 15% Cu, 1 to 10% Ti and 1 to 10% Co based on the number of atoms of Fe of said $Fe_3O_4$, and oxidizing said thin film of $Fe_3O_4$ to $\gamma$-$Fe_2O_3$ in an oxygen-containing atmosphere at a temperature in the range from 150° to 450° C.

12. The method of claim 9 comprising forming said film of $\gamma$-$Fe_2O_3$ to have a coercive force up to about 2000 Oe and a squareness ratio of at least 0.6.

* * * * *

UNITED STATES PATENT AND TRADEMARK OFFICE
CERTIFICATE OF CORRECTION

PATENT NO. : 4,232,061  Page 1 of 2
DATED : November 4, 1980
INVENTOR(S) : Hattori et al.

It is certified that error appears in the above—identified patent and that said Letters Patent is hereby corrected as shown below:

Front page, in [73], Assignee:
    after "Fujitsu Limited" insert -- , Kawasaki, Japan and Nippon Telegraph and Telephone Public Corporation, Tokyo, Japan --.

Front page, in [56], References Cited:
    line 3, "11/1963" should be --1/1963--;
    line 5, "Bala" should be --Baba--;
    line 6, "Hulaby" should be --Halaby--;
    line 7, "3,837,104" should be --3,837,910--; "Van der Luar" should be --Van der Laan et al.--;
    line 8, "Matsumato" should be --Matsumoto--;
    line 13, after "Ishii" insert --et al.--;
    line 14, "Hirabagaski" should be --Hirabayashi--;
    line 15, "Bennet et al." should be --Bennetch--.

Column 1, line 18, "." should be --;--.
Column 3, line 1, "over reduc-" should be --over-reduc- --;
    lines 4, 5, 15, 16, 33, 39, 40, 50, and 51, "C." should be --C--;
    line 31, delete ".".
Column 4, line 51, ", and;" should be --; and--.
Column 5, lines 8, 47 and 61, "C." should be --C--.

UNITED STATES PATENT AND TRADEMARK OFFICE
CERTIFICATE OF CORRECTION

PATENT NO. : 4,232,061                    Page 2 of 2

DATED     : November 4, 1980

INVENTOR(S) : Hattori et al.

It is certified that error appears in the above—identified patent and that said Letters Patent is hereby corrected as shown below:

```
Column 6, line 1, ", and;" should be --; and--;
         lines 4, 5, 7, 66 and 67, "C." should be --C--;
         line 11, after "Ti" delete ",".
Column 7, lines 9, 13, 17, 23, 26, 41, 49 and 65, "C." should
         be --C--;
         line 13, ", and;" should be --; and--.
Column 8, lines 15, 16, 32, 34, 36 and 68, "C." should be --C--.
Column 9, line 1, "δ" should be --γ--;
         lines 3, 14, 16 and 31, "C." should be --C--.
Column 10, line 14, "C." should be --C--.
```

Signed and Sealed this

*Fifth* Day of *October 1982*

[SEAL]

*Attest:*

GERALD J. MOSSINGHOFF

*Attesting Officer*     *Commissioner of Patents and Trademarks*